May 2, 1950  F. C. DOEPKE  2,506,015
LABEL AND RECORD SET
Filed June 28, 1947
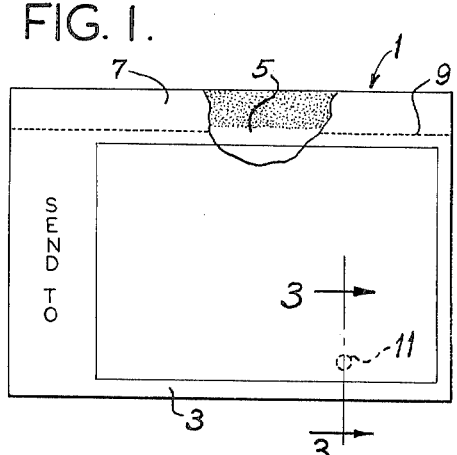
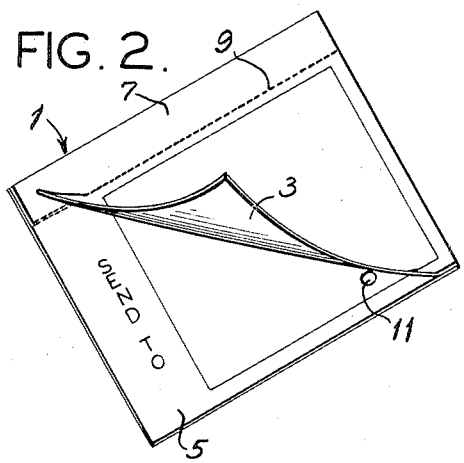
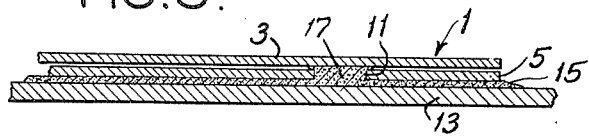
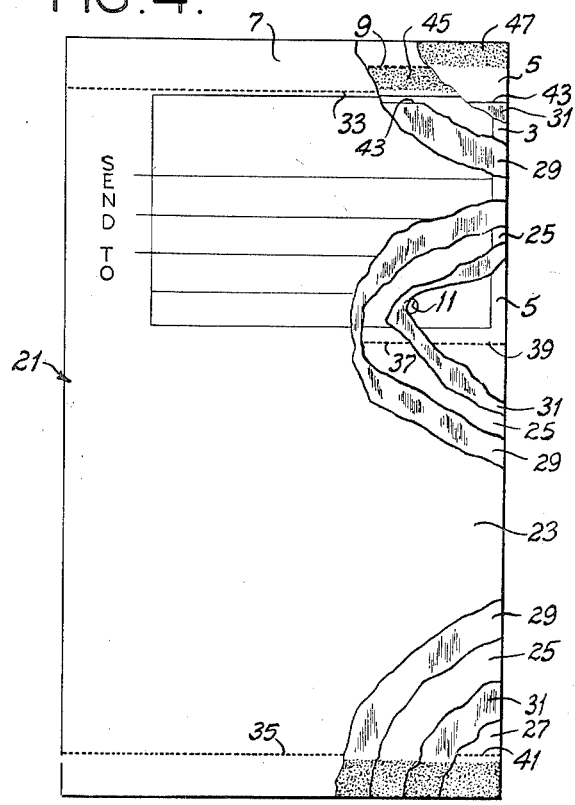
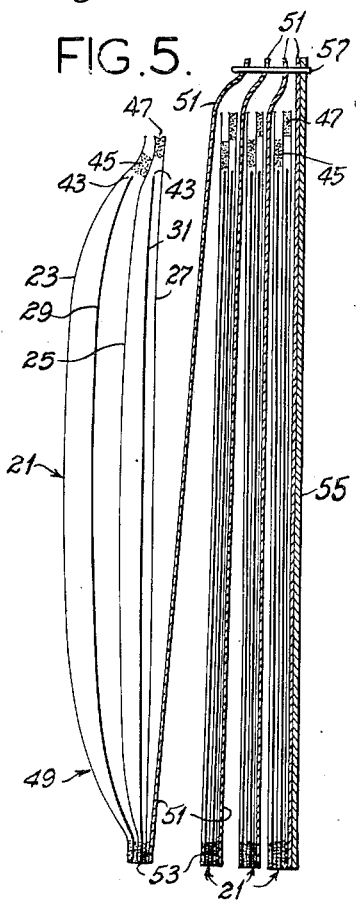
Frederick C. Doepke,
Inventor.
Haynes and Koenig,
Attorneys.

Patented May 2, 1950

2,506,015

UNITED STATES PATENT OFFICE 2,506,015

LABEL AND RECORD SET

Frederick C. Doepke, Normandy, Mo., assignor to Roy V. Flesh, Clayton, Mo.

Application June 28, 1947, Serial No. 757,753

4 Claims. (Cl. 282—24)

This invention relates to label and record sets, more particularly to a label and record set providing an address label adapted to be affixed to a package and a duplicate record of the label.

Among the several objects of the invention may be noted the provision of a label and record set providing an address label and a duplicate record of the label, both of which may be written simultaneously and adhesively affixed simultaneously to a package; the provision of a label and record set of the class described wherein provision is made for ready detachment of the duplicate record from the label and package while insuring that the duplicate record will remain attached to the label and package under customary conditions of handling; and the provision of a label and record set adapted for incorporation into manifold sales records, sales books, one-time carbon sets, continuous manifold forms and the like. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which several of various possible embodiments of the invention are illustrated:

Fig. 1 is a plan view of a label and record set of this invention;

Fig. 2 is a perspective of the label and record set of Fig. 1, a corner of a record sheet being illustrated as raised to show details;

Fig. 3 is an enlarged section taken substantially on line 3—3 of Fig. 1, illustrating the label and record set applied to a package, thicknesses being exaggerated;

Fig. 4 is a plan view of a manifold sales record set embodying a label and record set of this invention, parts being broken away; and, Fig. 5 is a side elevation of a sales book embodying a plurality of the sales record sets of Fig. 4, thicknesses being exaggerated.

Similar reference characters indicate corresponding parts throughout the several views of the drawing.

In filling orders in department stores and the like, which orders are to be delivered to the customer, it has been found desirable to make out not only an address label to be adhesively affixed to the packaged purchase to identify its destination, but also to make out a duplicate record of the address label to preserve a record of the delivery or for other purposes. In practice, an order is filled in the appropriate department of the store, the purchase is packaged at a wrapping counter, both the address label and the duplicate record are pasted on the package, and the package is then sent to the delivery department. In the delivery department, the duplicate record is torn off the package, leaving the address label pasted on the package to identify its destination. The duplicate record may be employed in making up a delivery route and is ultimately preserved so as to have a record of the delivery, if any adjustment should be subsequently claimed by the purchaser.

This invention provides a combination address label and duplicate record set which may be readily employed simultaneously to write out the label and duplicate record by manifold writing, which enables both the label and record simultaneously to be pasted on the package, and which provides for secure attachment of the duplicate record to the package, while permitting ready detachment of the duplicate record at the appropriate time. Thus, the duplicate record will not become lost in transit from the wrapping counter to the delivery department, and the record of the delivery may be properly preserved. The construction of the combination address label and duplicate record set is also such that it may be readily embodied in single or multiple sales order sets, sales books, continuous or individual set manifold forms and the like, with or without the so-called "one-time carbon" feature.

Referring now particularly to Figs. 1–3, a single combination address label and duplicate record set of this invention is generally designated 1. The set consists of a pair of superimposed sheets 3 and 5 which are detachably connected along one margin so that a sheet of carbon paper may be inserted therebetween and so that they may be readily torn apart. As illustrated herein, the sheets are pasted or otherwise secured together along one margin 7. The upper sheet 3 is perforated along a line 9 adjacent margin 7 so that it may be readily torn off and detached from the lower sheet 5. The lower sheet 5 has an aperture 11 therein for a purpose to be described.

Each of the upper and lower sheets 3 and 5 may have suitable printed indicia indicating various data concerning the sale which is to be written thereon. The lower sheet 5 forms the address label, which is to be pasted permanently to the package to be delivered. The upper sheet 3 forms the duplicate record of the address label, which is to be preserved as a record of the delivery.

In using the above-described combination address label and duplicate record set, a sheet of carbon paper is inserted between the sheets 3 and 5. The name and address of the purchaser, and any other desired data, are written upon the duplicate record sheet 3, a duplicate manifold copy thus being made upon the address label sheet 5. The set is then pasted upon the package 13 in which the purchase is to be delivered by applying a layer 15 of paste or other suitable adhesive to the package and applying the back of the address label 5 to the paste (Fig. 3). This provides for adhesive securement of the address label to the package over all or most of its bottom surface and for adhesive securement of the duplicate record sheet 3 to the package by means of a relatively small spot of paste 17 which is forced through the aperture 11 against the bottom surface of the sheet 3. Thus, provision is made, by means of aperture 11, for adhesive securement of the duplicate record sheet 3 to the package to augment the securement of the sheet 3 to the label 5 at the perforated line 9. This adhesive securement is over a limited area of the bottom of the duplicate record sheet 3 so that it may readily be detached from the address label 5 and the package without mutilation.

Since the duplicate record sheet 3 is pasted to the package at a point away from the perforated line 9, it is prevented from being inadvertently pulled upward away from label 5 about line 9 as a hinge. This tends to prevent the inadvertent tearing of sheet 3 away from label 5 until the proper time. Thus, the provision of aperture 11 in the label 5 provides not only for adhesive securement of the sheet 3 to the package when the label is pasted thereon, but also provides an arrangement which minimizes the possibility of sheet 3 being inadvertently detached from label 5 at line 9 until it is actually desired to separate the sheets.

The package with the duplicate record sheet 3 and address label 5 attached thereto is then sent to the delivery department. In this department, the duplicate record sheet is torn off. This is readily accomplished without mutilating the record sheet since it is secured to the label 5 at the readily severed perforated line 9 and to the package by the relatively small spot of adhesive 17. The address label 5 remains adhesively affixed to the package by the main layer of paste 15. The detached duplicate record sheet may then be employed in making up a delivery route and subsequently sent to the adjustment department to preserve a record of the delivery of the package.

Thus, an address label 5 and a duplicate record sheet 3 of the address label may simultaneously be addressed and simultaneously affixed to the package in which the purchase is to be delivered. Such packages are customarily roughly handled in transit from the wrapping counter to the delivery department and consequently the duplicate sheet 3 would be apt to become detached and lost if it were free to swing as a loose flap about line 9. The adhesive securement of the sheet 3 to the package at 17, however, tends to prevent sheet 3 from becoming detached from label 5 at line 9. Even if the sheet 3 is inadvertently separated from label 5 by tearing along line 9, the paste at 17 will retain sheet 3 adhesively secured to the package. The area of aperture 11, however, is small and consequently the area of adhesive securing sheet 3 to the package at 17 is sufficiently small that sheet 3 may be readily torn off the package without mutilation.

The above-described combination label and record set 1 is adapted to be embodied in any one of a large variety of different sales record forms or the like. Fig. 4 illustrates a single unit one-time carbon set 21 embodying a set 1. The set 21 includes a number of superimposed record sheets, three sheets 23, 25 and 27 being herein illustrated, with sheets of carbon paper 29 and 31 between adjacent record sheets. The uppermost sheet 23 constitutes an office copy record, to be retained by the store, and bearing suitable indicia designating the data which is to be written thereon. The name and address of the purchaser are to be written at the top of sheet 23. The latter is perforated along lines 33 and 35 adjacent its upper and lower ends.

The second record sheet 25 includes the duplicate record sheet 3, of the label and duplicate record set 1. As illustrated, duplicate record sheet 3 is the upper portion of sheet 25, being readily detachable from its lower portion along a perforated line 37. The duplicate record sheet 3 is again perforated along a line 9 adjacent its upper margin, line 9 being above the upper perforation line 33 of office copy record sheet 23.

The third record sheet 27 includes the address label 5, of the label and duplicate record set 1. As illustrated, address label 5 is the upper portion of sheet 27, being readily detachable from its lower portion along a perforated line 39 aligned with perforated line 37 of sheet 25. Sheet 27 also has a line of perforations 41 adjacent its lower end.

The sheets 23, 25 and 27 are superimposed with carbon 29 between 23 and 25 and carbon 31 between 25 and 27. All the sheets and carbons are pasted together at their lower ends outside of perforated lines 35 and 41. The carbons are of lesser length than the sheets so that their upper ends lie within the perforated line 33 of sheet 23, as indicated at 43. The upper end of sheet 25 is pasted to the back of the upper end of sheet 23 between perforated lines 9 and 33, as indicated at 45. The upper end of sheet 27 is pasted to the upper end of sheet 25 outside perforated line 9, as indicated at 47.

The above-described single unit one-time carbon set 21 is such that when the name and address of the purchaser, and any other desired data, is written on the upper portion of the office copy record sheet 23 a manifold copy is made upon duplicate record sheet 3 and address label 5 therebelow. Other data identifying the details of the purchase may be written on the lower portion of the office copy record sheet 23, a manifold copy being made upon the lower portions of sheets 25 and 27. The set 21 may then be torn apart on the perforated lines 33, 35, 37, 39, and 41 to separate the various copies. The duplicate record sheet 3 is allowed to remain attached to the address label 5, however, along perforated line 9, so that the set 21 is separable into its various copies and the label and record set 1 of Figs. 1 and 2. The latter is then applied to package 13 in the manner previously described and illustrated in Fig. 3.

Fig. 5 illustrates a mode of binding the single unit one-time carbon sets 21 of Fig. 4 into a sales book 49. For this purpose, an additional sheet 51 of greater length than sheets 23, 25 and 27 has its lower end pasted to the lower end of sheet 27, as indicated at 53. A plurality of such sets are then stacked upon a backing sheet 55 and staples 57 are driven through the upper ends of sheets 51 and the upper end of sheet 55 to clinch the assembly together in book form.

It will be understood that the label and record set 1 may be embodied in many other types of sets than the single unit one-time carbon set 21 and sales book 49 illustrated. It will also be understood that additional copy sheets and carbons, as desired, may be added to set 21. The essential feature of the invention is the provision of superimposed, detachably joined label and duplicate record sheets, the label sheet having an aperture therein through which paste may extend from the bottom of the label sheet for adhesive securement of the duplicate record sheet over a small area to goods. The aperture may be in any suitable portion of the address label. It may even be a notch in its periphery, and the term "aperture" is intended to cover such an arrangement.

It will be understood that although the invention is shown (Figs. 1 and 2) with the hole 11 in the sheet 5 which takes the duplicate imprint, this hole may be placed in the sheet 3. The latter may then be folded back on a line such as 9 and under sheet 5 for attachment of sheet 3 to the package. Hence sheet 3 would be attached and sheet 5 would be the one to be locally attached by the adhesive and subsequently to be torn free. This would constitute a mere reversal and it is intended that such constructions be covered herein.

It will be understood that although perforations are indicated for line 9, equivalents would be scoring, pre-folding or the like, in order to form a hinge and detachable effect.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A label and record set comprising a label sheet adapted to be permanently adhesively applied over the area of its back face to goods to be labeled, a duplicate record sheet overlying the front face of the label sheet and detachably joined to the label sheet, said label sheet having an aperture therein underlying the detachable duplicate record sheet so that when the label sheet is adhered to the goods, adhesive may flow through the aperture adhesively to affix the back of the duplicate record sheet to the goods over the limited area of the aperture, the area of the aperture and the resultant area of adhesive securing the duplicate record sheet to the goods being sufficiently small that the duplicate record sheet may be readily detached without mutilation.

2. A label and record set comprising a label sheet adapted to be permanently adhesively applied over the area of its back face to goods to be labeled, a duplicate record sheet overlying the front face of the label sheet and detachably joined to the label sheet at a line of detachment so that the duplicate record sheet may be readily torn from the label sheet, said sheets being separable for insertion of a sheet of carbon paper therebetween, said label sheet having an aperture therein underlying the detachable duplicate record sheet so that when the label sheet is adhered to the goods, adhesive may flow through the aperture adhesively to affix the back of the duplicate record sheet to the goods over the limited area of the aperture, the area of the aperture and the resultant area of adhesive securing the duplicate record sheet to the goods being sufficiently small that the duplicate record sheet may be readily detached without mutilation.

3. A label and record set comprising a label sheet adapted to be permanently adhesively applied over the area of its back face to goods to be labeled, a duplicate record sheet overlying the front face of the label sheet and secured along one margin to the label sheet, said duplicate record sheet having a line of detachment adjacent said margin so that it may be readily torn from the label sheet, said label sheet having an aperture therein underlying the detachable duplicate record sheet so that when the label sheet is adhered to the goods, adhesive may flow through the aperture adhesively to affix the back of the duplicate record sheet to the goods over the limited area of the aperture, the area of the aperture and the resultant area of adhesive securing the duplicate record sheet to the goods being sufficiently small that the duplicate record sheet may be readily detached without mutilation.

4. A sales record set comprising a plurality of detachably connected sheets associated with carbons therebetween, the uppermost sheet constituting an office copy record or the like, the second sheet constituting at least in part a duplicate address label record sheet, the third sheet constituting at least in part an address label sheet directly below the duplicate record sheet, said address label sheet being adapted to be permanently adhesively applied over the area of its back face to goods to be labeled and having an aperture therein underlying the detachable duplicate record sheet so that when the label sheet is adhered to the goods, adhesive may flow through the aperture adhesively to affix the back of the duplicate record sheet to the goods over the limited area of the aperture, the area of the aperture and the resultant area of adhesive securing the duplicate record sheet to the goods being sufficiently small that the duplicate record sheet may be readily detached without mutilation.

FREDERICK C. DOEPKE.

REFERENCES CITED

The following references are of record in the file of this patent:

UNITED STATES PATENTS

| Number | Name | Date |
| --- | --- | --- |
| 2,187,925 | Wolfanger | Jan. 23, 1940 |
| 2,253,917 | Rogers | Aug. 26, 1941 |